US007077777B2

(12) United States Patent
Miyata et al.

(10) Patent No.: US 7,077,777 B2
(45) Date of Patent: Jul. 18, 2006

(54) CONTINUOUSLY VARIABLE TRANSMISSION

(75) Inventors: Sinji Miyata, Kanagawa (JP); Daping Liu, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/263,725

(22) Filed: Oct. 4, 2002

(65) Prior Publication Data

US 2003/0069106 A1    Apr. 10, 2003

(30) Foreign Application Priority Data

Oct. 5, 2001 (JP) .......................... P2001-309844

(51) Int. Cl.
*F16H 37/02* (2006.01)
*F16H 41/04* (2006.01)
*B60W 10/04* (2006.01)

(52) U.S. Cl. .................. 475/208; 475/216; 477/41; 477/143

(58) Field of Classification Search ................ 475/207, 475/208, 215, 216; 477/41, 143
See application file for complete search history.

(56) References Cited

U.S. PATENT DOCUMENTS

| | | | |
|---|---|---|---|
| 5,888,160 A | | 3/1999 | Miyata et al. |
| 6,063,002 A | * | 5/2000 | Nobumoto et al. ............ 477/41 |
| 6,074,320 A | | 6/2000 | Miyata et al. |
| 6,251,038 B1 | * | 6/2001 | Ishikawa et al. ............ 475/216 |
| 6,251,039 B1 | | 6/2001 | Koga |
| 6,306,059 B1 | * | 10/2001 | Yamada ....................... 475/216 |
| 6,569,051 B1 | * | 5/2003 | Hirano et al. ............... 475/208 |
| 6,634,977 B1 | * | 10/2003 | Ooyama ....................... 475/208 |
| 2002/0028722 A1 | * | 3/2002 | Sakai et al. .................. 475/215 |
| 2002/0111244 A1 | | 8/2002 | Miyata et al. |

FOREIGN PATENT DOCUMENTS

| | | |
|---|---|---|
| JP | 10-196759 | 7/1998 |
| JP | 11-108147 | 4/1999 |
| JP | 2000-220719 | 8/2000 |

* cited by examiner

*Primary Examiner*—Roger Pang
(74) *Attorney, Agent, or Firm*—Sughrue Mion, PLLC

(57) ABSTRACT

A continuously variable transmission has: an input shaft, an output shaft, a toroidal type continuously variable transmission, and a planetary gear mechanism including a sun gear, a ring gear and a planetary gear. The power transmitted to first and second power transmission systems is made to converge to two gears of the planetary gear mechanism, and a remaining gear is coupled with the output shaft. A mode changeover device effects a changeover between, during forward movement, a first mode for a low speed side, which utilizes the first power transmission system and a second mode for a high speed side, which utilizes the first and second power transmission systems. Such changeover is effected by the operation of connecting and disconnecting a first mode clutch and a second mode clutch. The operation of effecting the changeover between the first mode and the second mode is effected in 0.2 to 1 second.

5 Claims, 11 Drawing Sheets

CONTINUOUSLY VARIABLE TRANSMISSION

BACKGROUND OF THE INVENTION

1. Field of the Invention

This invention relates to improvements in a continuously variable transmission incorporating therein a toroidal type continuously variable transmission utilized, for example, as a transmission for an automobile.

2. Description of the Related Art

U.S. Pat. No. 5,888,160 discloses a continuously variable transmission which includes an input shaft rotatively driven by a drive source, an output shaft for taking out power based on the rotation of this input shaft, a toroidal type continuously variable transmission having input and output discs and a power roller which are interposed between the input shaft and the output shaft, and a planetary gear mechanism.

This continuously variable transmission has two modes for a low speed side and a high speed side during forward movement, wherein the mode for the low speed side utilizes a power transmission system routed through only the toroidal type continuously variable transmission and the mode for the high speed side utilizes a power transmission system routed through the toroidal type continuously variable transmission and a power transmission system not routed through the toroidal type continuously variable transmission. The arrangement provided is such that these two power transmission systems are inputted to any two gears of a sun gear, a ring gear, and planetary gears of a planetary gear mechanism, the remaining one gear is coupled with the output shaft, and an output is obtained as the differential component of the two gears. Since the power transmitted through the toroidal type continuously variable transmission becomes small in the mode for the high speed side, this continuously variable transmission offers the advantages of becoming highly efficient and having long life.

With the continuously variable transmission disclosed in U.S. Pat. No. 5,888,160, the torque inputted to the toroidal type continuously variable transmission during a mode change for effecting changeover between the low speed mode and the high speed mode changes greatly from the plus side to the minus side (or vice versa). For example, the input torque during a mode change in which the mode for the low speed side is changed over to the mode for the high speed side changes from +350 Nm to −280 Nm.

Also, in the geared neutral system wherein two power transmission systems are utilized in the mode for the low speed side and a mode in which only the toroidal type continuously variable transmission is routed through is utilized in the mode for the high speed side, and wherein in the mode for the low speed side the differential component of the planetary gears is set to 0 rotation to make a starting clutch unnecessary, the inversion of positive and negative sides of the torque similarly occurs when the two modes are changed over. Incidentally, in the geared neutral system, the mode change is effected when the toroidal type continuously variable transmission is on the low speed side.

In addition to these systems, there is a continuously variable transmission for producing two or modes by combining the toroidal type continuously variable transmission and planetary gears, but the positive and negative sides of the torque are inverted in many layouts at the time of the mode change. For example, a two-mode continuously variable transmission such as the one disclosed in U.S. Pat. No. 6,251,039 is present.

However, the toroidal type continuously variable transmission has a characteristic that when the torque is changed, the speed changes as shown in FIG. 7. FIG. 7 shows the results of measurement at a time when the number of revolution was fixed to 2000 revolutions or thereabouts, the oil temperature and the like were controlled at a temperature close to that during actual vehicle running, and no speed change commands were issued, but only the torque was varied. If the torque is varied in this manner, the toroidal type continuously variable transmission undergoes a speed change despite the fact that no speed change has been issued.

The following reasons are conceivable as the causes of this speed change.

(1) When a load is applied to the toroidal type continuously variable transmission, a traction force occurs in the vertical direction (the direction of the axis of inclination of the trunnion supporting the power roller), the force of the piston of a mechanism for moving the trunnion acts in the opposite direction as a reaction force thereof. Of course, gaps are present in a radial needle roller bearing supporting the power roller and a radial needle roller bearing supporting a pivot. For this reason, when a load is applied, the inner ring of the power roller moves in the vertical direction by the aggregate sum portion of these gaps. As this power roller moves in the vertical direction, side slippage occurs, with the result that the power roller undergoes a speed change.

(2) In addition, the transmission ratio changes with respect to the load of the torque due to the effect of the deflection of a trunnion shaft caused by the resilient deformation of the trunnion. In a traction drive, it is necessary to cause a pressing force to act on the traction contact point, and that force is supported by the trunnion.

In addition, the trunnion is supported by two yokes, and forces occurring between two portions of the trunnion in the back-and-forth direction and the left-and-right direction are canceled. Accordingly, the trunnion assumes a state in which a load is applied to a beam supported at two points, so that the trunnion naturally undergoes resilient deformation. Consequently, although a trunnion shaft itself is not resiliently deformed since it is not subjected to forces, but the trunnion shaft is affected by the resilient deformation of the trunnion, with the result that the trunnion shaft becomes inclined. As a result, the point of contact between a precess cam of a mechanism for moving the trunnion and a valve link moves, so that the spool moves in the axial direction. In consequence, the valve is cut, and the differential pressure occurs, resulting in the occurrence of the speed change.

Due to the combination of these factors, as shown in FIG. 7, on application of the torque, the toroidal type continuously variable transmission undergoes a speed change despite the fact that no speed change command has been issued.

If the variation of speed change is of such a nature that it occurs stably, it is possible to suppress the occurrence of a shock in speed change by issuing a speed change command. However, the situation must be avoided in which control becomes unstable at the time of the mode change, i.e., when the torque has varied. Incidentally, at the time of the mode changeover, the driver does not intend to make the mode change, and the mode change takes place while the driver is unaware. Accordingly, if the time duration of connection and disconnection of the clutch is long in the mode change, the state becomes such that no power is being generated, so that the driver feels a sense of uncomfortableness due to such as the revving up of the engine.

From the above, it can be understood that the mode change must be effected stably, and at the same time that the mode change needs to be completed by momentarily shifting the clutch in a short time.

SUMMARY OF THE INVENTION

The invention has been devised in view of the above-described circumstances, and its object is to provide a continuously variable transmission which does not impart an uncomfortable feeling to the driver by suppressing the occurrence of a speed change shock by obtaining stable variations of torque in the mode change.

To attain the above object, according to the invention, there is provided a continuously variable transmission comprising:

an input shaft rotatively driven by a drive source;

an output shaft for taking out power based on the rotation of the input shaft;

a toroidal type continuously variable transmission;

a planetary gear mechanism including:

a sun gear;

a ring gear disposed around the sun gear; and a planetary gear provided between the sun gear and the ring gear, wherein two transmission paths are provided for transmitting the power from the drive source to the output shaft, and wherein the power transmitted to first and second power transmission systems are made to converge to two gears of the sun gear, the ring gear, and the planetary gear, and a remaining gear other than the two gears is coupled with the output shaft; and a mode changeover device effecting a changeover between, during forward movement, a first mode for a low speed side and a second mode for a high speed side, the changeover between the first and second modes being effected by the operation of connecting and disconnecting a first mode clutch and a second mode clutch, wherein the operation of effecting the changeover between the first mode and the second mode is effected in 0.2 to 1 second.

Further, in the continuously variable transmission, the two power transmission paths may be the first power transmission system for transmitting the power to the planetary gear mechanism through the toroidal type continuously variable transmission and the second power transmission system for transmitting the power to the planetary gear mechanism without being routed through the toroidal type continuously variable transmission, wherein the first mode utilizes the first power transmission system and the second mode utilizes the first and second power transmission systems.

Moreover, in the continuously variable transmission, the mode changeover device may be a control circuit which effects the operation of connecting and disconnecting the first mode clutch and the second mode clutch in response to an output signal of the control circuit.

In addition, in the continuously variable transmission, the toroidal type continuously variable transmission may be of a single cavity type.

Furthermore, in the continuously variable transmission, the toroidal type continuously variable transmission may be of a double cavity type.

DETAILED DESCRIPTION OF THE PREFERRED EMBODIMENTS

Referring now to the accompanying drawings, a description will be given of the embodiments of the invention.

Figure 1:
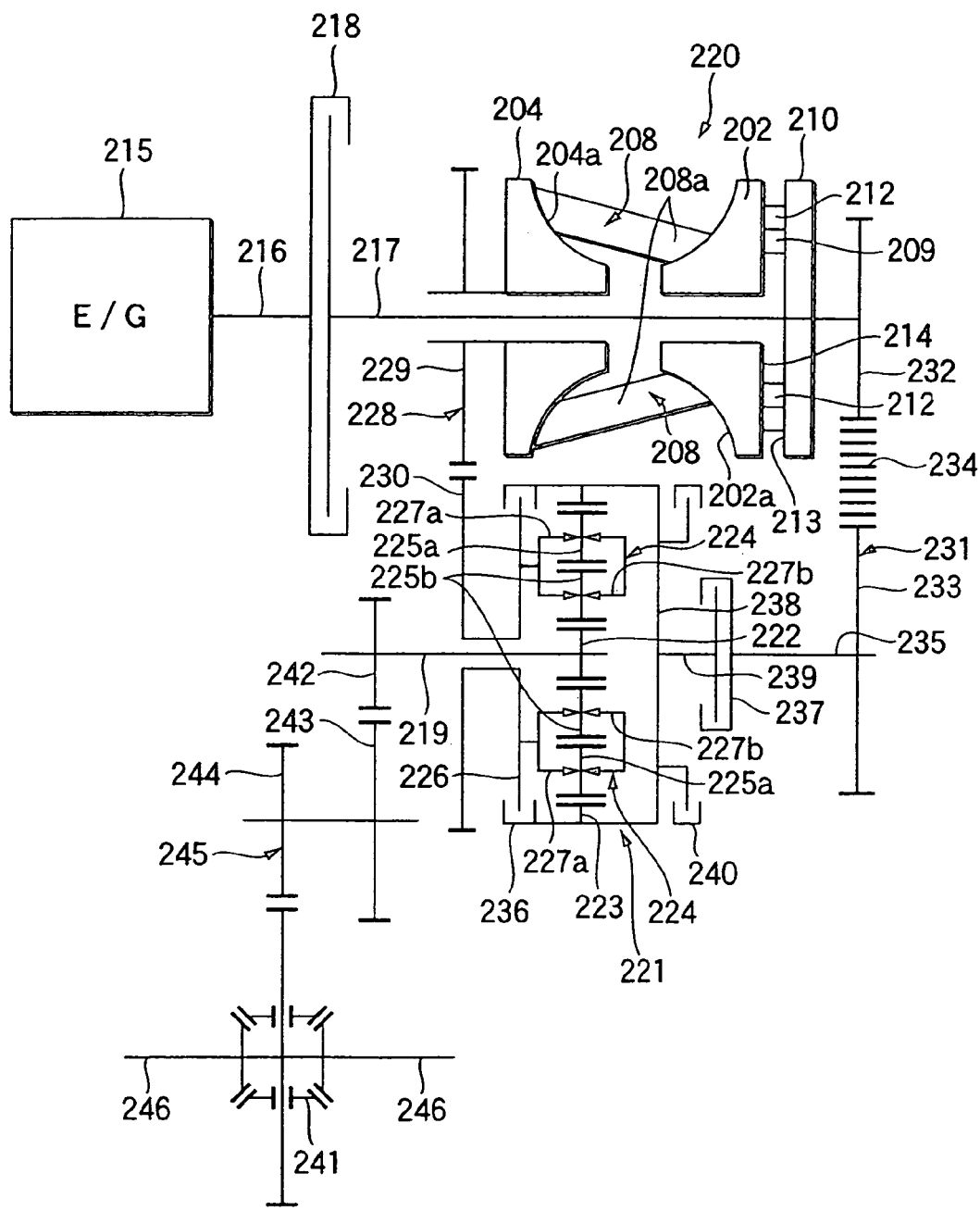
FIG. 1 is a skeleton diagram illustrating a continuously variable transmission according to a first embodiment of the invention.

FIG. 1 shows a first embodiment of the invention. A continuously variable transmission according to this embodiment is provided with an input shaft 217 connected to the crank shaft 216 of an engine 215 which is a drive source and rotatively driven by this engine 215. A starting clutch 218 is provided between the input side end portion (the left end portion as viewed in FIG. 1) of the input shaft 217 and the output side end portion (the right end portion as viewed in FIG. 1) of the crank shaft 216 in series with the crank shaft 216 and the input shaft 217. Accordingly, in the case of the present embodiment, the crank shaft 216 and the input shaft 217 are disposed concentrically with each other. In contrast, an output shaft 219 for taking out power based on the rotation of the input shaft 217 is disposed parallel to the input shaft 217. A single cavity-type toroidal type continuously variable transmission 220 is provided around the input shaft 217, and a planetary gear mechanism 221 is provided around the output shaft 219.

A cam plate 210 constituting the toroidal type continuously variable transmission 220 is fixed to the intermediate portion toward the output side end portion (rightward as viewed in FIG. 1) of the input shaft 217. Also, an input side disc 202 and an output side disc 204 are supported about the input shaft 217 for independent rotation relative to the input shaft 217 by bearings, not shown, such as needle bearings. Rollers 212 are interposed between a cam surface 213 formed on one surface (the left surface as viewed in FIG. 1) of the cam plate 210 and a cam surface 214 formed on the outside surface of the input side disc 202 to thereby constitute a pressing device 209. Accordingly, the input side disc 202 is rotated with the rotation of the input shaft 217 while being pressed toward the output side disc 204.

A plurality of (usually two to three) power rollers 208 are interposed between the inside surface 202a of the input side disc 202 and the inside surface 204a of the output side disc 204, and the peripheral surfaces 208a of these power rollers 208 are brought into contact with the above-mentioned inside surfaces 202a and 204a. These power rollers 208 are rotatably supported by unillustrated trunnions and displacement shafts. The toroidal type continuously variable transmission 220, like the heretofore widely known toroidal type continuously variable transmission, changes the transmission ratio between the input side disc 202 and the output side disc 204 by swinging the trunnions and changing the inclination angle of the displacement shafts supporting the power rollers 208.

A sun gear 222 constituting the planetary gear mechanism 221 is fixed to the input side end portion (the right end portion as viewed in FIG. 1) of the output shaft 219. Accordingly, this output shaft 219 is rotated with the rotation of the sun gear 222. A ring gear 223 is rotatably supported around the sun gear 222 to be concentric with the sun gear 222. A plurality of (usually three) planetary gear sets 224 are provided between the inner peripheral surface of the ring gear 223 and the outer peripheral surface of the sun gear 222. In the illustrated embodiment, these planetary gear sets 224 each comprise a combination of a pair of planetary gears 225a and 225b. These pairs of planetary gears 225a and 225b mesh with each other, and the planetary gear 225a disposed on the outer diameter side is brought into meshing engagement with the ring gear 223, while the planetary gear 225b disposed on the inner diameter side is brought into meshing engagement with the sun gear 222. As described above, each planetary gear set 224 Constituted by a pair of planetary gears 225a and 225b, makes the directions of rotation of the ring gear 223 and the sun gear 222 coincident with each other. Accordingly, if from the relation with other constituent portions, it is not necessary to make the directions of rotation of the ring gear 223 and the sun gear 222 coincident with each other, a single planetary gear may be brought into meshing engagement with both of the ring gear 223 and the sun gear 222.

The planetary gear sets 224 as described above are rotatably supported on one side surface (the right side surface as viewed in FIG. 1) of a carrier 226 by pivot shafts 227a and 227b parallel to the output shaft 219. The carrier 226 is rotatably supported on the intermediate portion of the output shaft 219 by a bearing, not shown, such as a needle bearing.

Also, the carrier 226 and the output side disc 204 are connected together so as to be capable of transmitting a rotational force by a first power transmitting mechanism 228. This first power transmitting mechanism 228 includes first and second gears 229 and 230 meshing with each other. That is, the first gear 229 is fixed to the outside surface portion (the left side surface as viewed in FIG. 1) of the output side disc 204 concentrically with the output side disc 204, while the second gear 230 is fixed to one side surface portion (the left side surface as viewed in FIG. 1) of the carrier 226 concentrically with the carrier 226. Accordingly, the carrier 226 is rotated at a speed corresponding to the numbers of teeth of the first and second gears 229 and 230 in a direction opposite to the direction of rotation of the output side disc 204 with the rotation of this output side disc 204.

On the other hand, the input shaft 217 and the ring gear 223 can be connected together so as to be capable of transmitting a rotational force by a second power transmitting mechanism 231. This second power transmitting mechanism 231 includes first and second sprockets 232 and 233, and a chain 234 extended between these two sprockets 232 and 233. That is, the first sprocket 232 is fixed to the output side end portion (the right end portion as viewed in FIG. 1) of the input shaft 217 which protrudes from the cam plate 210, while the second sprocket 233 is fixed to the input side end portion (the right end portion as viewed in FIG. 1) of a transmitting shaft 235. This transmitting shaft 235 is disposed concentrically with the output shaft 219 and is rotatably supported by a bearing, not shown, such as a rolling bearing. Accordingly, the transmitting shaft 235 is rotated at a speed corresponding to the numbers of teeth of the first and second sprockets 232 and 233 in the same direction as the input shaft 217 with the rotation of this input shaft 217.

The continuously variable transmission according to the present embodiment is provided with a clutch mechanism. This clutch mechanism connects only one of the carrier 226 and the transmitting shaft 235 being a constituent member of the second power transmitting mechanism 231, to the ring gear 223. In the case of the present embodiment, this clutch mechanism comprises a clutch 236 for low speed corresponding to a first mode clutch of the invention and a clutch 237 for high speed corresponding to a second mode clutch of the invention. The clutch 236 for low speed is provided between the outer peripheral edge portion of the carrier 226 and one axial end portion (the left end portion as viewed in FIG. 1) of the ring gear 223. The clutch 236 for low speed prevents, at the time of connection, the relative rotation of the sun gear 222, the ring gear 223 and the planetary gear sets 224 which construct the planetary gear mechanism 221, so that the sun gear 222 and the ring gear 223 are integrally connected. Also, the clutch 237 for high speed is provided between the transmitting shaft 235 and a central shaft 239 fixed to the ring gear 223 through a support plate 238.

Figure 2:
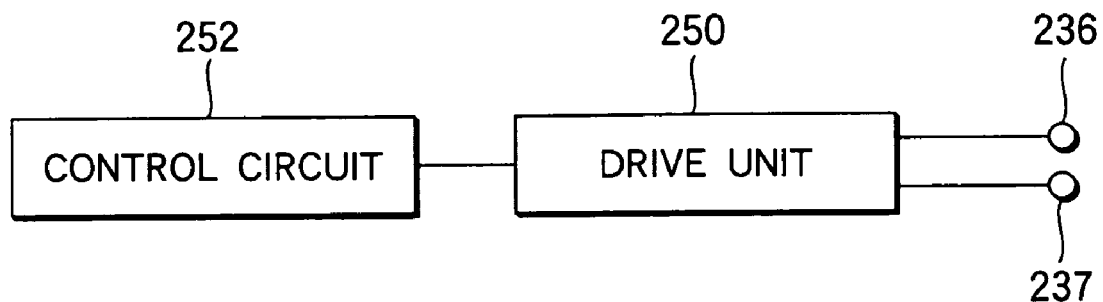
FIG. 2 is a block diagram illustrating a mode changeover device according to the first embodiment.

Here, as shown in FIG. 2, a drive unit 250 for driving the clutch 236 for low speed and the clutch 237 for high speed is electrically connected to a control circuit 252 corresponding to the mode changeover device of the invention, and the operation of connection and disconnection of the clutch 236 for low speed and the clutch 237 for high speed is effected in response to output signals from the control circuit 252, with a predetermined changeover operation time being provided. Here, the changeover operation time in the present embodiment is set to 0.2 to 1 second.

Further, as shown in FIG. 1, a clutch 240 for backward movement is provided between the ring gear 223 and a fixed portion such as the housing (not shown) of the continuously variable transmission. This clutch 240 for backward movement is provided to rotate the output shaft 219 in the opposite direction to move an automobile backward. This clutch 240 for backward movement is disconnected when one of the clutch 236 for low speed and the clutch 237 for high speed is connected. Meanwhile, when this clutch 240 for backward movement is connected, both of the clutch 236 for low speed and the clutch 237 for high speed are disconnected. That is, except the starting clutch 218, the remaining three clutches 236, 237 and 240 are such that when one of them is connected, the remaining two clutches are disconnected.

Further, in the illustrated embodiment, the output shaft 219 and a differential gear 241 are connected together by a third power transmitting mechanism 245 including third to fifth gears 242 to 244. Accordingly, when the output shaft 219 is rotated, a pair of right and left drive shafts 246 are rotated through the third power transmitting mechanism 245 and the differential gear 241 to thereby rotatively drive the drive wheels of the automobile.

The action of the continuously variable transmission according to the present embodiment constructed as described above is as follows. First, during low speed running, under control by the control circuit 252, the clutch 236 for low speed is connected while the clutch 237 for high speed and clutch 40 for backward movement are disconnected with the changeover operation time of 0.2 to 1 second. When, in this state, the starting clutch 218 is connected and the input shaft 217 is rotated, only the toroidal type continuously variable transmission 220 transmits power from the input shaft 217 to the output shaft 219. That is, with the connection of the clutch 236 for low speed, the ring gear 223 and the carrier 226 are integrally coupled together and the relative rotation of the gears 222, 223, 225a and 225b constituting the planetary gear mechanism 221 becomes impossible. Also, as the clutch 237 for high speed and the clutch 40 for backward movement are disconnected, the ring gear 223 becomes rotatable independently of the rotational speed of the transmitting shaft 235.

Accordingly, when, in this state, the input shaft 217 is rotated, this rotation is transmitted to the input side disc 202 through the pressing device 209, and is further transmitted to the output side disc 204 through the plurality of power rollers 208. The rotation of this output side disc 204 is transmitted to the carrier 226 and the ring gear 223 through the first and second gears 229 and 230 constituting the first power transmitting mechanism 228. As described above, in this state, the relative rotation of the gears 222, 223, 225a and 225b constituting the planetary gear mechanism 221 is impossible and, therefore, the output shaft 219 is rotated at the same speed as the carrier 226 and the ring gear 223.

The action itself when the transmission ratio between the input side and output side discs 202 and 204 is changed during such low speed running is similar to that in the case of the well-known toroidal type continuously variable transmission. Of course, in this state, the transmission ratio between the input shaft 217 and the output shaft 219, i.e., the transmission ratio as the total continuously variable transmission, is proportional to the transmission ratio of the toroidal type continuously variable transmission 220. Also, in this state, a torque inputted to this toroidal type continuously variable transmission 220 becomes equal to a torque applied to the input shaft 217. During low speed running, the first and second sprockets 232 and 233 and the chain 234 constituting the second power transmitting mechanism 231 only rotate idly.

In contrast, during high speed running, under control by the control circuit 252, the clutch 237 for high speed is connected while the clutch 236 for low speed and the clutch 40 for backward movement are disconnected with the changeover operation time of 0.2 to 1 second. When, in this state, the starting clutch 218 is connected and the input shaft 217 is rotated, the first and second sprockets 232 and 233 and the chain 234 constituting the second power transmitting mechanism 231, as well as the planetary gear mechanism 221, transmit power from this input shaft 217 to the output shaft 219.

That is, when the input shaft 217 is rotated during the high speed running, this rotation is transmitted to the central shaft 239 through the second power transmitting mechanism 231 and the clutch 237 for high speed to thereby rotate the ring gear 223 to which the central shaft 239 is fixed. The rotation of this ring gear 223 in turn is transmitted to the sun gear 222 through the plurality of planetary gear sets 224 to thereby rotate the output shaft 219 to which the sun gear 222 is fixed. Assuming that when the ring gear 223 has become the input side, the planetary gear sets 224 are stopped (do not revolve around the sun gear 222), the planetary gear mechanism 221 effects speed increase at a transmission ratio conforming to the ratio between the numbers of teeth of the ring gear 223 and the sun gear 222. However, each of the planetary gear sets 224 revolves around the sun gear 222, and the transmission ratio as the total continuously variable transmission changes in conformity with the speed of revolution of these planetary gear sets 224. Therefore, if the transmission ratio of the toroidal type continuously variable transmission 220 is changed to thereby change the speed of revolution of the planetary gear sets 224, the transmission ratio as the total continuously variable transmission can be adjusted.

Next, a description will be given of the reason for the operation in which the control circuit effects a mode change by changing over the clutch 236 for low speed and the clutch 237 for high speed (clutch connection and disconnection) with the changeover operation time set to 0.2 to 1 second.

Figure 7:
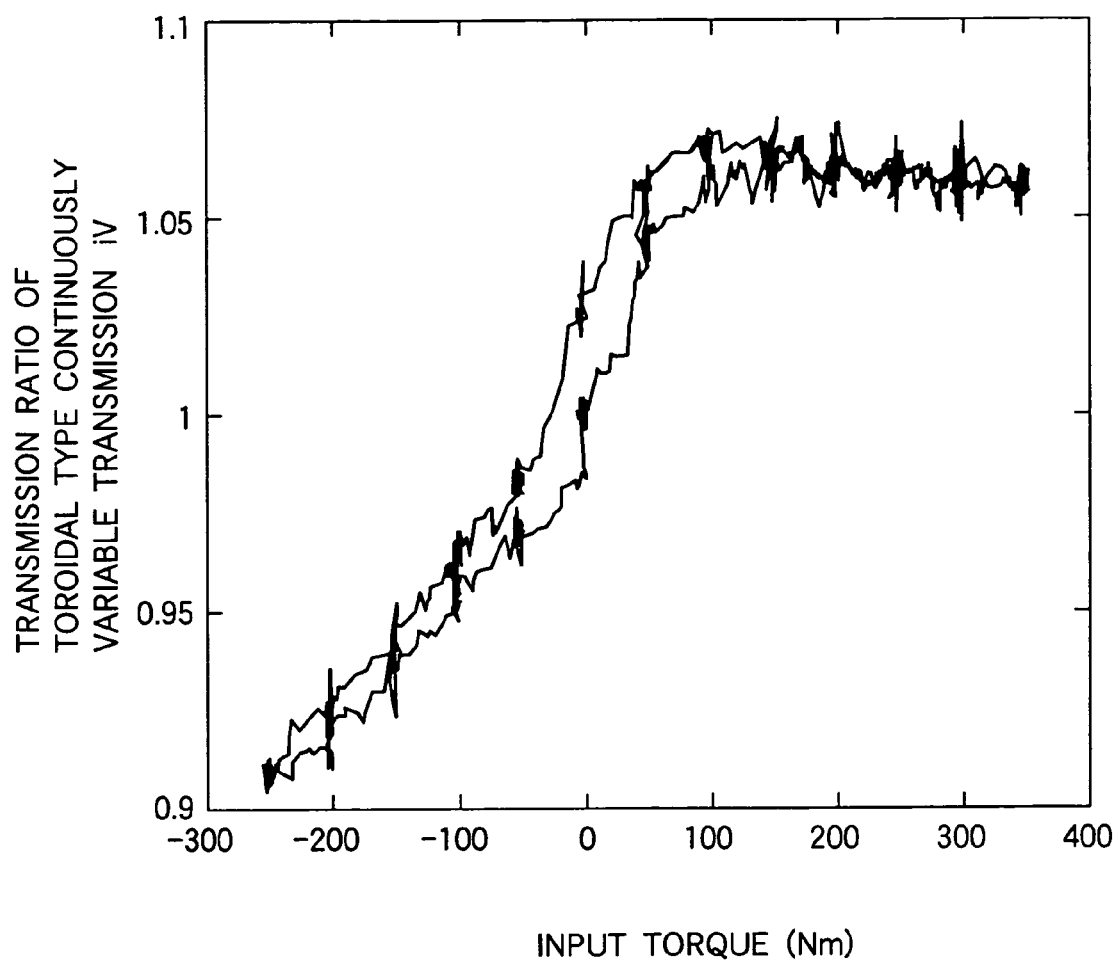
FIG. 7 is a diagram illustrating a state in which, on application of the torque, a toroidal type continuously variable transmission undergoes a speed change despite the fact that no speed change command has been issued in the first embodiment.

By using an analysis program for the continuously variable transmission, the present inventors conducted an analysis on the sudden change of the torque, i.e., the case in which a mode change is effected by momentarily changing over the clutch 236 for low speed and the clutch 237 for high speed. It should be noted that as this analysis program, one was used in which the validity of the program was confirmed by conducting verification after making a comparison with the results of an experiment (e.g., FIG. 7) in the case where the torque was changed statically.

Figure 3:
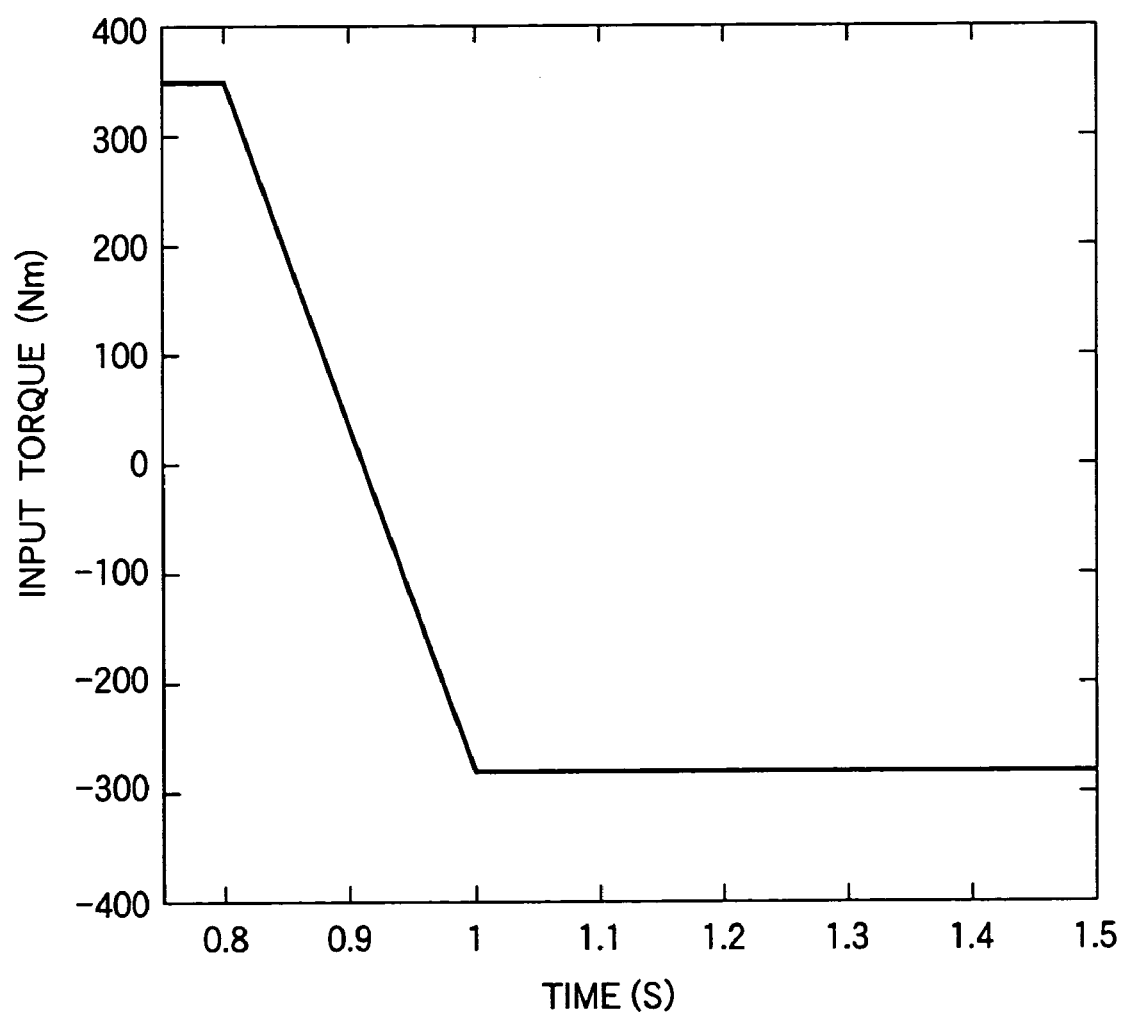
FIG. 3 is a diagram illustrating a case in which the torque is changed suddenly in the first embodiment.

A case is considered in which the torque is suddenly changed from 350 Nm to −280 Nm, as shown in FIG. 3. In FIG. 3, the torque was changed in 0.2 second. An analysis was conducted by changing the differential time in steps from 0.1 second to 0.5 second.

Figure 4:
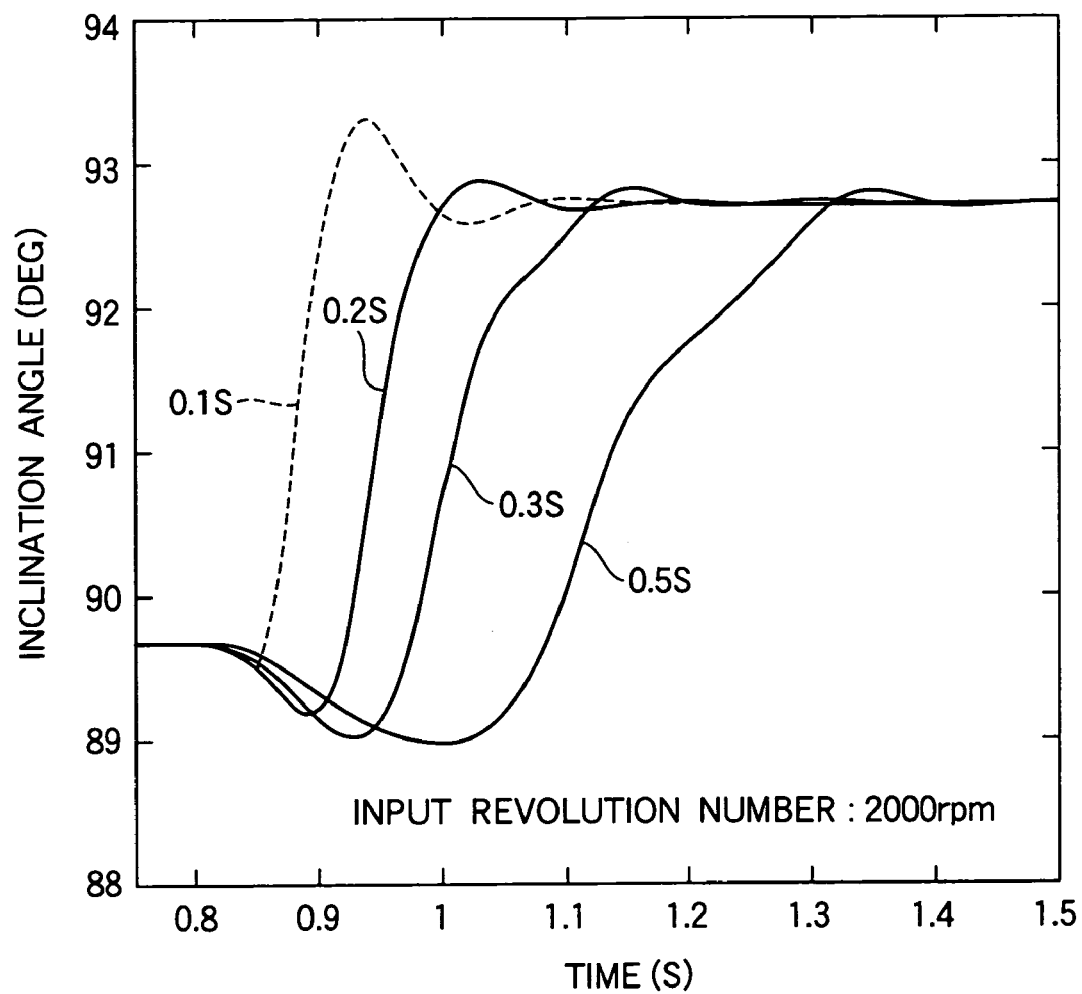
FIG. 4 is a diagram illustrating the torque change in a case where the mode changeover time for clutches is varied with the number of input revolution set to 2000 revolutions in the first embodiment.

Stable results were obtained in the case where the torque change was effected in 0.2 second or more as in the present embodiment, as shown in FIG. 4. However, if the torque change was effected in 0.1 second, an overshoot occurred and a small hunting occurred, with the result that control became unstable. In FIG. 4, the number of input revolution was set to 2,000 revolutions under the substantially fixed condition.

Figure 5:
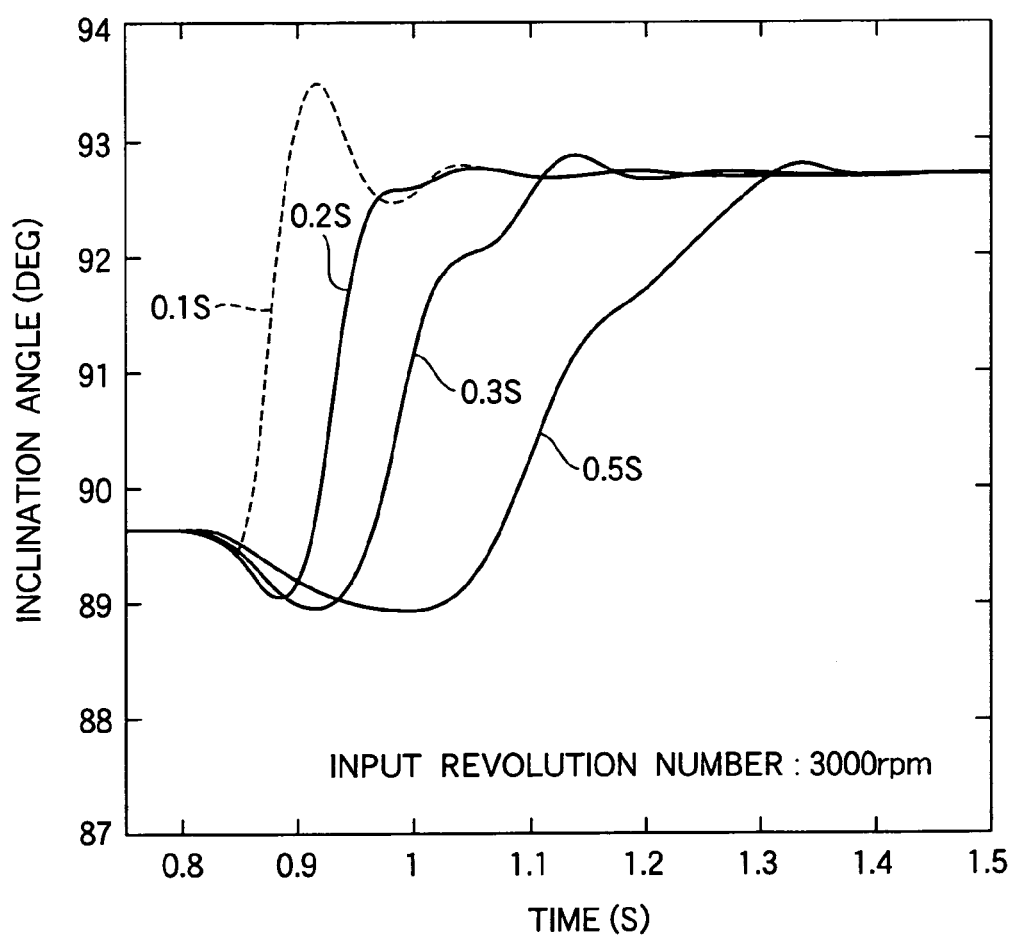
FIG. 5 is a diagram illustrating the torque change in a case where the clutch mode changeover time was varied with the number of input revolution set to 3000 revolutions in the first embodiment.
Figure 6:
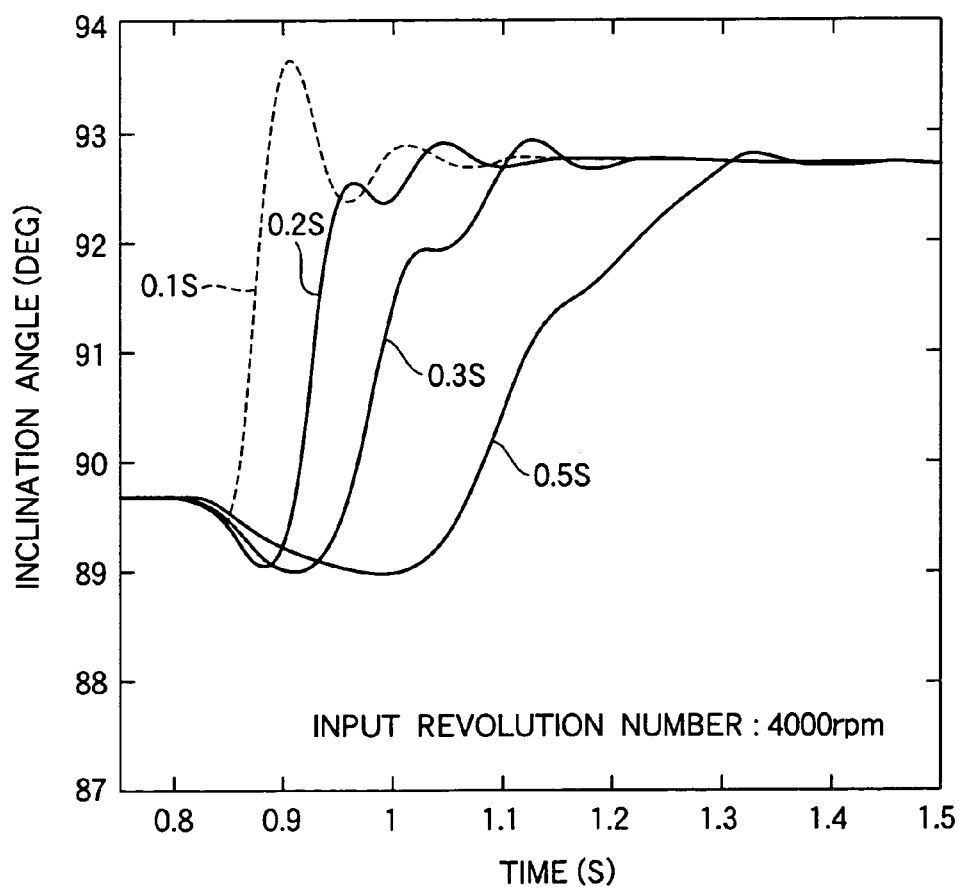
FIG. 6 is a diagram illustrating the torque change in a case where the clutch mode changeover time was varied with the number of input revolution set to 4000 revolutions in the first embodiment.

FIG. 5 shows the results of analysis in which the number of input revolution was 3,000 revolutions, and FIG. 6 shows the results of analysis in which the number of input revolution was 4,000 revolutions. These drawings reveal that the higher the number of revolution, the more effective it is if the mode change is made by changing over the clutch 236 for low speed and the clutch 237 for high speed. At 4,000 revolutions, although a small hunting was observed when the torque change was effected in 0.2 second, no overshoot occurred. It should be noted that in all the analyses the transmission ratio was set to the high side.

Thus, stable results of speed change can be obtained if the mode change is made by effecting the torque change in 0.2 second or more, i.e., by changing over the clutch 236 for low speed and the clutch 237 for high speed in 0.2 second or more.

In addition, if the time for connecting or disconnecting the clutch is long, the state becomes such that the transmission of power is cut off, so that the acceleration of the automobile is lost, and the engine revs up. Accordingly, it is preferred that the time duration of the mode change or the disconnection of the torque be completed within one second.

Therefore, by effecting the mode change by changing over the clutch 236 for low speed and the clutch 237 for high speed in 0.2 to 1 second, a stable torque change can be obtained and the occurrence of a shock in speed change is suppressed, imparting no uncomfortable feeling to the driver.

Next, FIGS. 8 to 11 show a second embodiment of the invention. This continuously variable transmission includes an input side rotating shaft (input shaft) 11b, an output shaft 29a, a toroidal type continuously variable transmission 19a, a planetary gear device 20a, a first power transmitting means 34a and a second power transmitting means 40a. The input side rotating shaft 11b of these members is connected to a drive source such as an unillustrated engine disposed on the left-hand side in FIG. 8, and is rotatively driven by this drive source.

The output shaft 29a is for taking out power based on the rotation of the input side rotating shaft 11b, and is connected to an unillustrated vehicle-wheel drive shaft through an unillustrated differential gear and the like.

Figure 8:
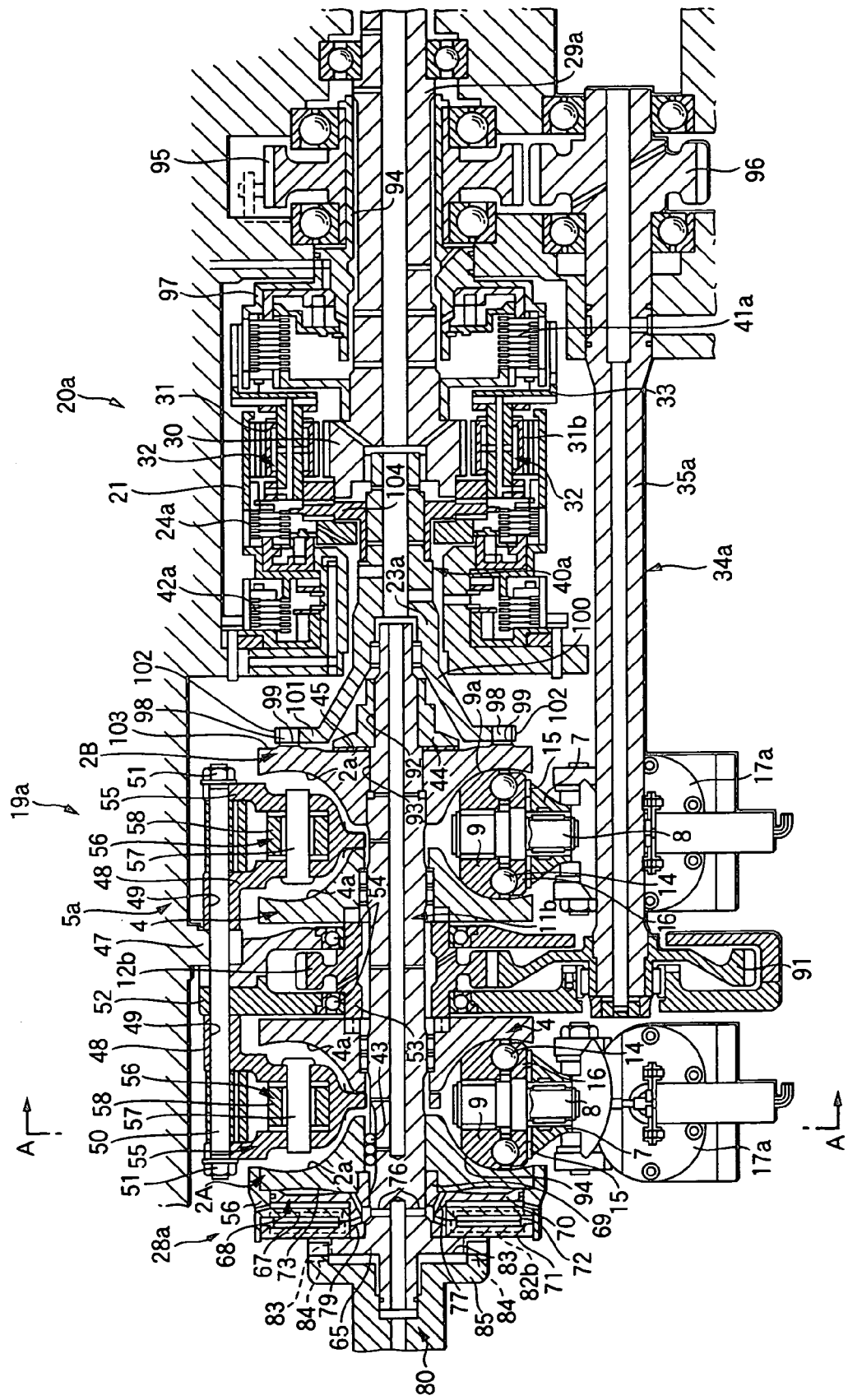
FIG. 8 is a cross-sectional view of essential portions illustrating a continuously variable transmission according to a second embodiment of the invention.
Figure 9:
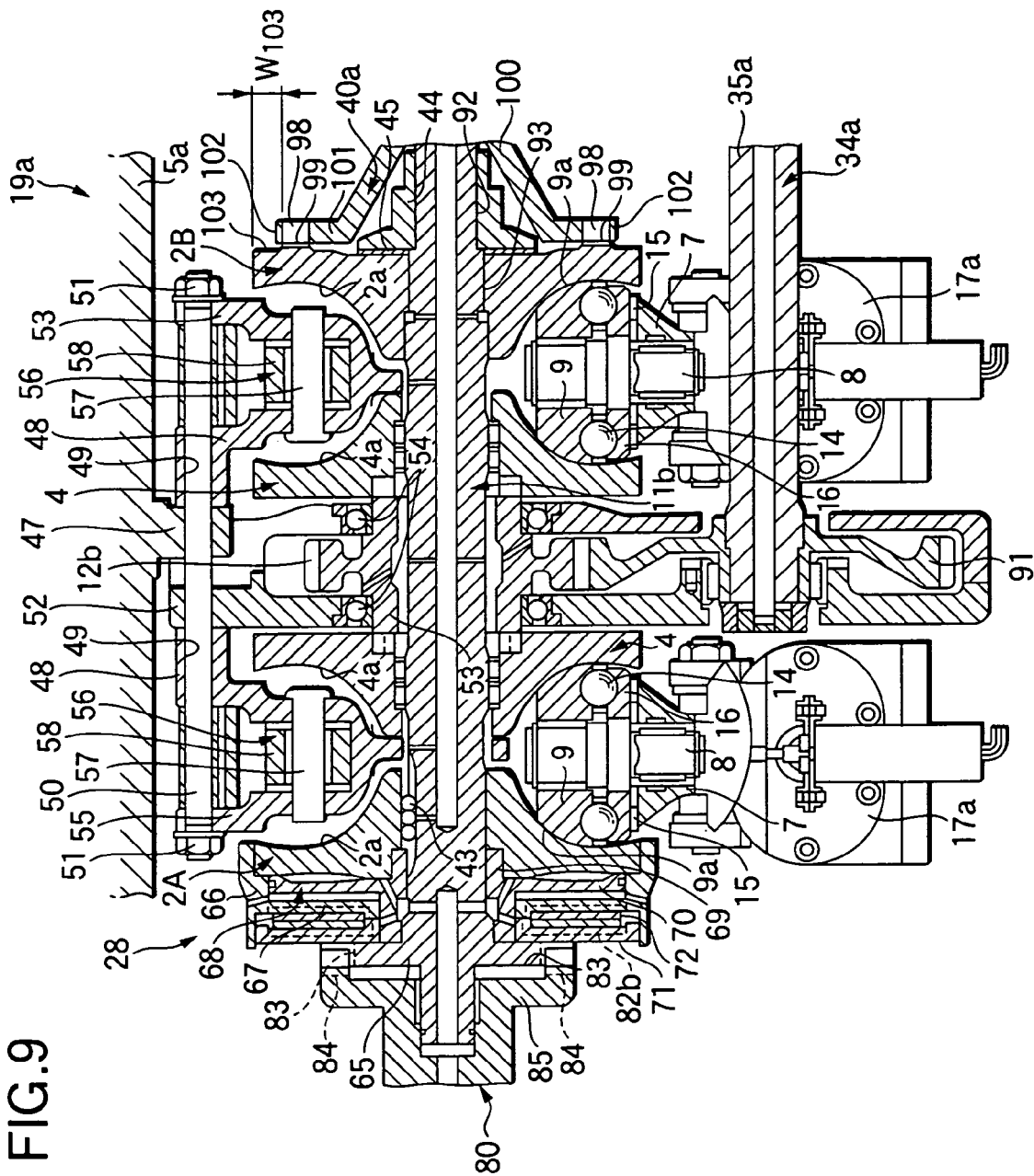
FIG. 9 is an enlarged view of a left-hand portion of FIG. 8.

The toroidal type continuously variable transmission 19a is of the double cavity type and is provided with three trunnions 7 and three power rollers 9 in each cavity, or six trunnions 7 and six power rollers 9 in total. To construct such a toroidal type continuously variable transmission 19a, a pair of input side discs (input discs) 2A and 2B are supported on both end portions of the input side rotating shaft 11b so as to be rotatable in synchronism with the input side rotating shaft 11b with their inside surfaces 2a opposing each other. Of these discs, the input side disc 2A on the left-hand side as viewed in FIG. 8 is supported on the input side rotating shaft 11b through a ball spline 43 so as to be axially displaceable. In contrast, the input side disc 2B on the right-hand side as viewed in FIG. 8 is fixed to the input side rotating shaft 11b as its rear surface is held by a loading nut 44 in a state in which the input side disc 2B is splined to the tip portion of the input side rotating shaft 11b. It should be noted that a shim plate 45 is interposed between this loading nut 44 and the input side disc 2B.

Further, a pair of output side discs (output discs) 4 are supported so as to be rotatable in synchronism with each other between the pair of input side discs 2A and 2B around the intermediate portion of the input side rotating shaft 11b in a state in which their respective inside surfaces 4a are opposed to the inside surfaces 2a of the respective input side discs 2A and 2B. Further, the power rollers 9 each rotatably supported on the inside surface of the trunnion 7 are interposed between the inside surfaces 2a and 4a of each of the input side discs 2A and 2B and each of the output side discs 4. Thrust ball bearings 14 for allowing the rotation of the power rollers 9 while supporting the load in the thrust direction applied to the power rollers 9, as well as thrust needle roller bearings 15 for bearing the thrust load applied from the power rollers 9 to outer rings 16 constituting the thrust ball bearings 14, are provided in that order from the sides of the outside surfaces of the respective power rollers 9 and between the outside surfaces of the respective power rollers 9 and the inside surfaces of the intermediate portions of the respective trunnions 7.

To support the trunnions 7, a yoke 48 is supported and fixed to a mounting portion 47 provided on the inner surface of a casing 5a by means of shafts 50 inserting in mounting holes 49 in three positions of an outside diameter-side end portion of this yoke 48 and nuts 51 threadedly engaged on these shafts 50. In the illustrated example, a gear housing 52 is fixed between the mounting portion 47 and the yoke 48 by the shafts 50 and the nuts 51. On the inside diameter side of this gear housing 52, an output sleeve 53 to which the above-mentioned pair of output side discs 4 are engaged with its both end portions by a concave/convex arrangement is rotatably supported by a pair of roller bearings 54, and an output gear 12b provided on an outer peripheral surface of the intermediate surface of this output sleeve 53 is accommodated inside the above-mentioned gear housing 52.

In addition, the yoke 48 as a whole is formed in a star shape, and its radially intermediate portion or outside-diameter side portion is formed in a bifurcated manner, thereby forming three holding portions 55 at equal intervals in the circumferential direction. An intermediate portion of each supporting piece 56 is pivotally supported by each second pivot shaft 57 in the radially intermediate portion of each of these holding portions 55. Each of these supporting pieces 56 is formed by a cylindrical mounting portion 58 disposed around each second pivot shaft 57 and a pair of supporting plate portions 59 projecting radially outward from the outer peripheral surface of this mounting portion 58. The angle of intersection of the pair of supporting plate portions 59 is 120 degrees. Accordingly, the supporting plate portions 59 of the circumferentially adjacent supporting pieces 56 are parallel to each other.

Circular holes 60 are respectively formed in the supporting plate portions 59 thus constructed. In a case where each of the supporting pieces 56 is in a neutral state, the circular holes 60 formed in the supporting plate portions 59 of the circumferentially adjacent supporting pieces 56 are concentric with each other. Further, in the respective circular holes 60, pivot shafts 6 provided on both end portions of each trunnion 7 are supported by radial needle roller bearings 61. The outer peripheral surfaces of outer rings 62 making up these radial needle roller bearings 61 are formed into spherical convex surfaces. The outer rings 62 thus constructed are fitted in the circular holes 60 without play in such a manner as to be swingable and displaceable. In addition, circular arc-shaped elongated holes 63 concentric with the above-mentioned circular holes 60 are formed in portions of the supporting plate portions 59, and the amount of clearance in the direction of the pivot shaft of each trunnion 7 is adjusted so as to be free of play by using in each of these elongated holes 63 a setscrew 64 provided projectingly on an end surface (shoulder portion) of each trunnion 7.

Each of the power rollers 9 is supported through a displacement shaft 8 on the inside surface of each of the trunnions 7 thus supported inside the casing 5a. Further, peripheral surfaces 9a of the power rollers 9 and the inside surfaces 2a and 4a of the respective discs 2A, 2B and 4 are caused to abut against each other. A hydraulic pressing device 28a is incorporated between the input side disc 2A and the input side rotating shaft 11b on the proximal end side to secure the surface pressure of the abutment portions (traction portions) of the respective surfaces 9a, 2a and 4a, thereby ensuring that the transmission of power by the toroidal type continuously variable transmission 19a can be effected efficiently.

To construct the pressing device 28a, an outwardly-facing flange portion 65 is fixedly provided on a portion close to the proximal end of the outer surface of the input side rotating shaft 11b, and a cylinder barrel 66 is externally fitted and held oiltightly on the input side disc 2A on the proximal end side in such a manner as to axially project from the outside surface (from the left surface as viewed in FIGS. 8 and 9) of this input side disc 2A. The inside diameter of the cylinder barrel 66 is small in its axially intermediate portion and large at its both end portions, and the input side disc 2A is internally fitted oiltightly in the large-diameter portion on the distal end side of these portions. In addition, an inwardly-facing flanged partition plate portion 67 is provided on the inner peripheral surface of the intermediate portion of the cylinder barrel 66, and a first piston member 68 is provided between the inner peripheral surface of the cylinder barrel 66 and the outer peripheral surface of the input side rotating shaft 11b.

This first piston member 68 has an outwardly-facing flanged partition plate 70 formed on the outer peripheral surface of the intermediate portion of a supporting cylinder portion 69 which is capable of being externally fitted on the input side rotating shaft 11b. The outer peripheral edge of this partition plate 70 is brought into sliding contact with the small-diameter portion of the intermediate portion of the inner peripheral surface of the cylinder barrel 66 oiltightly in such a manner as to be axially displaceable. In addition, in this state, the inner peripheral edge of the above-mentioned partition plate portion 67 is brought into sliding contact with the outer peripheral surface of the supporting cylinder portion 69 oiltightly in such a manner as to be axially displaceable. Further, an annular second piston member 71 is provided between the outer peripheral surface of the proximal end portion of the supporting cylinder portion 69 and the inner peripheral surface of the proximal end portion of the cylinder barrel 66. This second piston member 71 has its proximal end side surface abutting against the flange portion 65 to thereby prevent its axial displacement, and maintains the oiltightness among the inner and outer peripheral edges thereof, the outer peripheral surface of the proximal end portion of the supporting cylinder portion 69 and the inner peripheral surface of the proximal end portion of the cylinder barrel 66.

In addition, the cylinder barrel 66 having the partition plate portion 67 is pressed toward the input side disc 2A by a coned disc spring 72 interposed between this partition plate portion 67 and the second piston member 71. Accordingly, this input side disc 2A is pressed by a pressing force so as to impart surface pressure at least commensurate with the resiliency of the respective surfaces 9a, 2a and 4a (even in the state in which pressure oil is into introduced into the pressing device 28a). Accordingly, this resiliency is restricted to such a degree that slippage does not occur at the abutment portions of the respective surfaces 9a, 2a and 4a (excluding the piston for which slippage is unavoidable) when the transmission of very small power is effected by the toroidal type continuously variable transmission 19a.

In addition, the transmission of the rotational force from a drive shaft 80 to the input side rotating shaft 11b is effected through the flange portion 65. For this reason, notches 83 are formed at a plurality of portions of the outer peripheral edge portion of this flange portion 65, and these notches 83 and driving projections 84 formed at the end portion of the drive shaft 80 are made to engage each other. Consequently, in the case of the present embodiment, an outwardly-facing flanged coupling portion 85 is provided at the end portion of the drive shaft 80, and the driving projections 84 are provided projectingly on end portions close to the outside diameter of one surface of this coupling portion 85.

Figure 10:
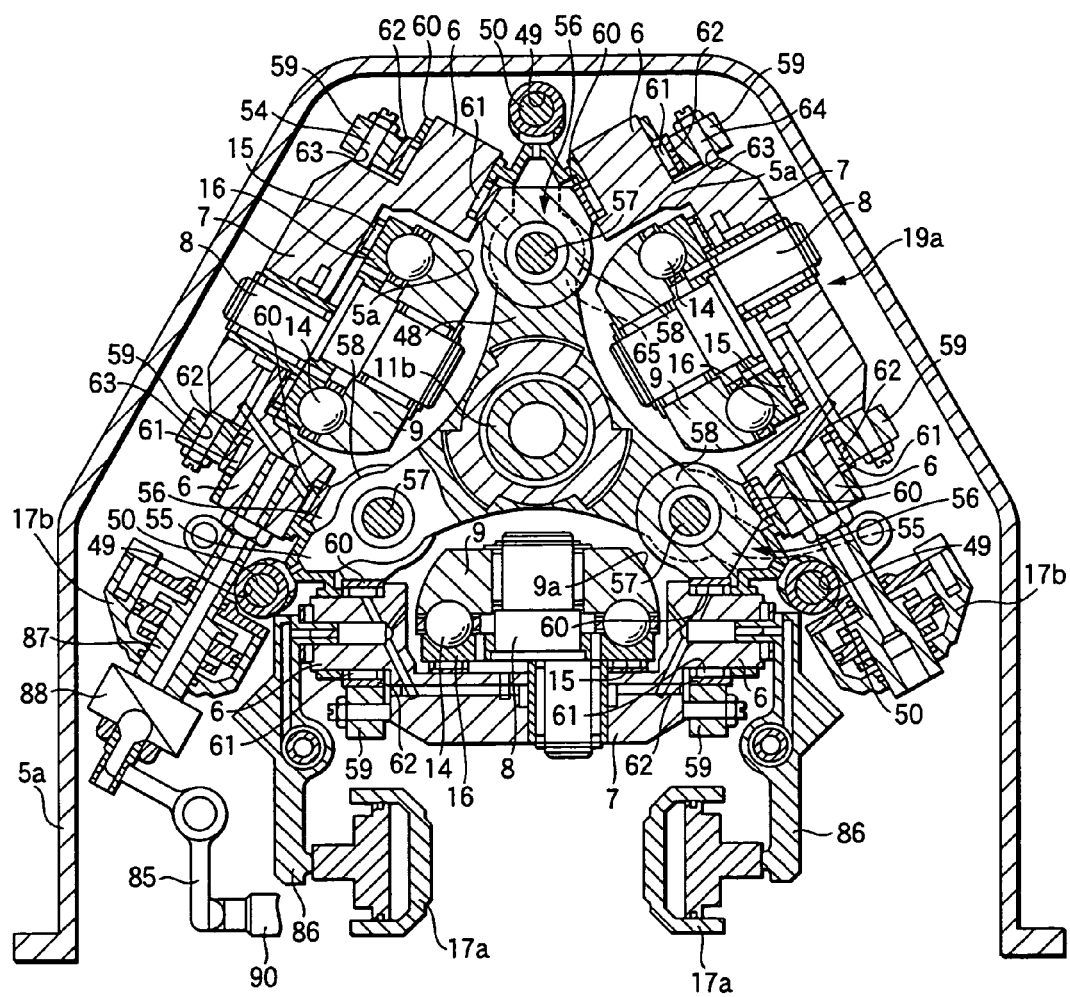
FIG. 10 is a cross-sectional view taken along line A—A in FIG. 8.

Furthermore, each of the trunnions 7 is provided with a pair of hydraulic actuators 17a and 17b to thereby render each trunnion 7 displaceable and drivable in the axial direction of the pivot shafts 6 provided at both end portions thereof. Of these trunnions 7, the trunnion 7 in the lower central portion in FIG. 10 is made displaceable and drivable in the axial direction of the pivot shafts 6 provided on both end portions thereof through lever arms 86 by the pair of actuators 17a which are respectively of the single-acting type (only a force in the extending direction is obtained) and whose pressing directions are mutually opposite. In the case where the trunnion 7 is to be displaced, pressure oil is fed into the hydraulic chamber of either one of the actuators 17a, and the hydraulic chamber of the other actuator 17a is set in a released state. In contrast, each of the trunnions 7 on both sides of the upper portion in FIG. 10 is made displaceable and drivable in the axial direction of the pivot shafts 6 provided on both end portions thereof by a pair of double-acting actuators 17b (a force in the extending direction or retracting direction is obtained on the basis of the changeover of the feeding or discharging direction of the pressure oil).

The displacement of the total of six trunnions 7 provided in the toroidal type continuously variable transmission 19a is effected for the same length each in synchronism with each other by feeding or discharging equal amounts of pressure oil to the respective actuators 17a and 17b by control valves. For this reason, a precess cam 88 is fixed to an end portion of a rod 87 which is displaced together with one of the trunnions 7 (in the illustrated example, the upper left one as viewed in FIG. 10), so that the attitude of the trunnion 7 is transmittable to a spool 90 of the control valve through a link 89.

The planetary gear device 20a includes a sun gear 30, a ring gear 21 and planetary gear sets 32. Of these members, the sun gear 30 is fixed to the input side end portion (the left end portion as viewed in FIG. 8) of the output shaft 29a. Accordingly, this output shaft 29a rotates with the rotation of the sun gear 30. The ring gear 21 is supported around this sun gear 30 concentrically and rotatably with the sun gear 30. Further, the plurality of planetary gear sets 32 each combining a pair of planetary gears 31a and 31b are provided between the inner peripheral surface of the ring gear 21 and the outer peripheral surface of the sun gear 30. Each pair of planetary gears 31a and 31b are brought into meshing engagement with each other, and the planetary gear 31a disposed on the outside diameter side is brought into meshing engagement with the ring gear 21, while the planetary gear 31b disposed on the inside diameter side is brought into meshing engagement with the sun gear 30. These planetary gear sets 32 are rotatably supported on one side surface (the left side surface as viewed in FIG. 8) of a carrier 33. In addition, this carrier 33 is rotatably supported around the intermediate portion of the above-mentioned output shaft 29a.

In addition, the carrier 33 and the pair of output side discs 4 for constituting the toroidal type continuously variable transmission 19a are connected by the first power transmitting means 34a in such a state as to be capable of transmitting the rotating torque. To make up this first power transmitting means 34a, a transmitting shaft 35a parallel to the input side rotating shaft 11b and the output shaft 29a is provided, and a gear 91 fixed to one end portion (the left end portion as viewed in FIG. 8) of this transmitting shaft 35a is brought into meshing engagement with the output gear 12b. In addition, a sleeve 94 is rotatably disposed around the intermediate portion of the output shaft 29a, and a gear 95 supported on the outer peripheral surface of this sleeve 94 and a gear 96 fixedly provided on the other end portion (the right end portion as viewed in FIG. 8) of the transmitting shaft 35a are brought into meshing engagement with each other through an idle gear (not shown) Further, the carrier 33 is supported around the sleeve 94 through an annular coupling bracket 97 so as to be rotatable in synchronism with the sleeve 94. Accordingly, as the output side discs 4 rotate, the carrier 33 rotates at a speed corresponding to the numbers of teeth of the above-mentioned gears 12b, 91, 95 and 96 in a direction opposite to that of the output side discs 4. It should be noted that a clutch 41a for low speed is provided between the coupling bracket 97 and the carrier 33, on the one hand, and the output shaft 29a.

On the other hand, the input side rotating shaft 11b and the ring gear 21 are made connectable in a state allowing the transmission of the rotating torque by means of the input side disc 2B supported on the distal end portion of the input side rotating shaft 11b and a transmitting shaft 23a disposed concentrically with this input side rotating shaft 11b. For this reason, a plurality of projecting portions 98 are projectingly provided on portions of the outside surface (the right side surface as viewed in FIGS. 8 and 9) of the input side disc 2B which are half portions close to the outside diameter than the central portion of the outside surface with respect to the radial direction. In the case of this embodiment, these projecting portions 98 are respectively circular-arc shaped and are disposed intermittently at equal intervals on the same circular arcs having the center axis of the input side disc 2B as their center. Further, retaining notched portions 99 are set between the circumferential end faces of the circumferentially adjacent projecting portions 98.

On the other hand, a transmission flange 101 is provided at a proximal end portion of the transmitting shaft 23a through a conical tube-shaped transmission cylinder portion 100. Further, transmitting projections 102 in a number identical to that of the retaining notched portions 99 are formed on the outer peripheral edge portion of this transmission flange 101 at equal intervals in the circumferential direction. Further, these transmitting projections 102 and the retaining notched portions 99 are engaged with each other to permit the transmission of the torque between the input side disc 2B and the transmitting shaft 23a. Since the diameters of engaging portions of the these transmitting projections 102 and the retaining notched portions 99 are sufficiently large, a sufficiently large torque can be transmitted between the input side disc 2B and the transmitting shaft 23a.

This continuously variable transmission has a clutch mechanism includes a clutch 24a for high speed, the clutch 41a for low speed, and a clutch 42a for backward movement. This clutch mechanism includes wet type multiple disc clutches, which are connected or disconnected on the basis of the feeding or discharging of pressure oil into hydraulic cylinders attached thereto. In a case where one clutch is connected, the remaining two clutches are disconnected.

First, during low speed running, the clutch 41a for low speed is connected while the clutch 24a for high speed and the clutch 42a for backward movement are disconnected. When, in this state, the input side rotating shaft 11b is rotated, only the toroidal type continuously variable transmission 19a transmits power from the input side rotating shaft 11b to the output shaft 29a. That is, in this state, the rotation of the output gear 12b of the toroidal type continuously variable transmission 19a is transmitted to the carrier 33 through the first power transmitting means 34a. As the clutch 41a for low speed is connected, the planetary gear device 20a is such that its constituent gears 21, 30, 31a and 31b are in the relatively undisplaceable state, so that the rotation of the carrier 33 is transmitted as it is to the sun gear 30, thereby rotating the output shaft 29a on which this sun gear 30 is fixedly provided.

During high speed running, the clutch 24a for high speed is connected while the clutch 41a for low speed and the clutch 42a for backward movement are disconnected with the changeover operation time of 0.2 to 1 second. When, in this state, the input side rotating shaft 11b is rotated, the second power transmitting means 40a including the transmitting shaft 23a, as well as the planetary gear device 20a, transmit power from this input side rotating shaft 11b to the output shaft 29a. That is, when the input side rotating shaft 11b is rotated during the high speed running, this rotation is transmitted to the ring gear 21 through the transmitting shaft 23a, a coupling bracket 104 and the clutch 24a for high speed. Further, the rotation of this ring gear 21 in turn is transmitted to the sun gear 30 through the plurality of planetary gear sets 32 to thereby rotate the output shaft 29a to which the sun gear 30 is fixed. Therefore, if the transmission ratio of the toroidal type continuously variable transmission 19a is changed to thereby change the speed of revolution of the planetary gear sets 32, the transmission ratio as the total continuously variable transmission can be adjusted.

It should be noted that the planetary gear device 20a according to this embodiment corresponds to the planetary gear mechanism of the invention, the first power transmitting means 34a corresponds to the first power transmission system of the invention, the second power transmitting means 40a corresponds to the second power transmission system of the invention, the clutch 41a for low speed corresponds to the first mode clutch of the invention, and the clutch 24a for high speed corresponds to the second mode clutch.

Figure 11:
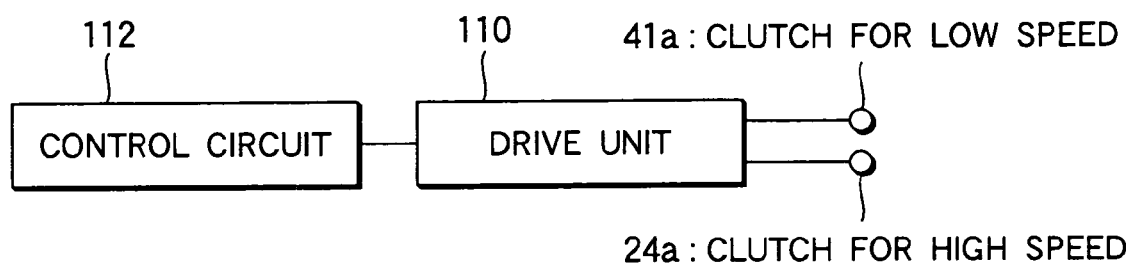
FIG. 11 is a block diagram illustrating a mode changeover means according to the second embodiment.

Here, as shown in FIG. 11, a drive unit 110 for driving the clutch 41a for low speed and the clutch 24a for high speed is electrically connected to a control circuit 112 corresponding to the mode changeover device of the invention, and the operation of connection and disconnection of the clutch 41a for low speed and the clutch 24a for high speed is effected in response to output signals from the control circuit 112, with a predetermined changeover operation time being provided. The changeover operation time in the present embodiment is set to 0.2 to 1 second.

The action of the continuously variable transmission according to the present embodiment constructed as described above is as follows. First, during low speed running, under control by the control circuit 112, the clutch 41a for low speed is connected while the clutch 24a for high speed and clutch 42a for backward movement are disconnected with the changeover operation time of 0.2 to 1 second. When, in this state, the starting clutch is connected and the input side rotating shaft 11b is rotated, only the toroidal type continuously variable transmission 19a transmits power from the input side rotating shaft 11b to the output shaft 29a. That is, with the connection of the clutch 41a for low speed, the ring gear 21 and the carrier 33 are integrally coupled together and the relative rotation of the gears constituting the planetary gear mechanism 32 becomes impossible. Also, as the clutch 24a for high speed and the clutch 42a for backward movement are disconnected, the ring gear 21 becomes rotatable independently of the rotational speed of the transmitting shaft 23a.

Further, as the control circuit 112 effects a mode change by changing over the clutch 41a for low speed and the clutch 24a for high speed (clutch connection and disconnection) with the changeover operation time set to 0.2 to 1 second, no overshoot occurs, and control becomes stable, so that results of stable speed change are obtained.

Accordingly, the occurrence of a shock in speed change is suppressed and no uncomfortable feeling is imparted to the driver in the same way as in the first embodiment.

As described above, although it has been described that the invention is effective for the continuously variable transmission which, during the low speed mode, utilizes a power transmission path routed through only the toroidal type continuously variable transmission and which, during the high speed mode, utilizes two power transmission paths, as disclosed in U.S. Pat. No. 5,888,160, the invention is also effective for a system in which the positive and negative sides of the torque are inverted as in the geared neutral system. Furthermore, the invention is also effected for a case where the positive and negative sides of the torque are inverted as with an engine brake.

As described above, in accordance with the invention, it is possible to provide a continuously variable transmission which does not impart an uncomfortable feeling to the driver by suppressing the occurrence of a speed change shock by obtaining stable variations of torque in the mode change between the first mode clutch and the second mode clutch.

What is claimed is:

1. A continuously variable transmission comprising:
   an input shaft rotatively driven by a drive source;
   an output shaft for taking out power based on the rotation of said input shaft;
   a toroidal type continuously variable transmission;
   a planetary gear mechanism including:
   a sun gear;
   a ring gear disposed around said sun gear; and
   a planetary gear provided between said sun gear and said ring gear,
   wherein two transmission paths are provided for transmitting the power from said drive source to said output shaft, and
   wherein the power transmitted to first and second power transmission paths is made to converge to two gears of said sun gear, said ring gear, and said planetary gear, and a remaining gear other than said two gears is coupled with said output shaft; and
   a mode changeover device effecting a changeover between, during forward movement, a first mode for a low speed side and a second mode for a high speed side, the changeover between the first and second modes being effected by the operation of connecting and disconnecting a first mode clutch and a second mode clutch, wherein said mode changeover device controls varying a time over which said changeover occurs,
   wherein the first mode clutch and the second mode clutch are wet clutches, and
   wherein the operation of effecting the changeover between the first mode and the second mode is effected in 0.2 to 1 second.

2. The continuously variable transmission according to claim 1, wherein said two power transmission paths are said first power transmission system for transmitting the power to said planetary gear mechanism through said toroidal type continuously variable transmission and said second power transmission system for transmitting the power to said planetary gear mechanism without being routed through said toroidal type continuously variable transmission, and
   wherein said first mode utilizes said first power transmission system and said second mode utilizes said first and second power transmission systems.

3. The continuously variable transmission according to claim 1, wherein said mode changeover device is a control circuit which effects the operation of connecting and disconnecting said first mode clutch and said second mode clutch in response to an output signal of said control circuit.

4. The continuously variable transmission according to claim 1, wherein said toroidal type continuously variable transmission is of a single cavity type.

5. The continuously variable transmission according to claim 1, wherein said toroidal type continuously variable transmission is of a double cavity type.

* * * * *